United States Patent [19]
Ulicki

[11] 3,757,225
[45] Sept. 4, 1973

[54] COMMUNICATION SYSTEM

[75] Inventor: Edward M. Ulicki, East Paterson, N.J.

[73] Assignee: Telebeam Corporation, New York, N.Y.

[22] Filed: Mar. 16, 1972

[21] Appl. No.: 235,167

[52] U.S. Cl. ........... 325/308, 178/5.1, 178/DIG. 13, 178/DIG. 23, 179/2 TV, 179/15 AP, 325/430, 325/452

[51] Int. Cl. ........ H04n 7/08, H04n 7/16, H04n 7/18

[58] Field of Search .......................... 178/5.1, 6, 6.8, 178/DIG. 13, DIG. 23; 179/2 TV, 15 AP; 325/308, 430, 452

[56] References Cited

UNITED STATES PATENTS

| | | | |
|---|---|---|---|
| 3,691,295 | 9/1972 | Fisk | 178/DIG. 13 |
| 3,668,307 | 6/1972 | Face | 178/DIG. 13 |
| 3,647,949 | 3/1972 | Closs | 178/DIG. 23 |
| 3,643,164 | 2/1972 | Sly | 325/308 |
| 3,592,962 | 7/1971 | Matthews | 178/DIG. 23 |

*Primary Examiner*—Howard W. Britton
*Attorney*—Myron Cohen et al.

[57] ABSTRACT

A communication system by which a plurality of substantially simultaneously transmitted different subscription programs may be selectively individually displayed on a common display channel. A multiplexed communication signal containing a plurality of different program information signals and a plurality of command signals is provided to a plurality of display devices which are capable of displaying different selected program information displays from the plurality of such signals in response to selected program information signals. Each display device has an associated means for controlling the selection of these programs which is connected to a common condition responsive means, such as a computer. The control means includes means for demultiplexing the communication signal and for generating a program information selection control signal in response to a uniquely identified command signal. A digital frequency synthesizer may be utilized to generate the control signal at a frequency which, when mixed with the demultiplexed plurality of subscription program information signals, provides the selected one at the frequency of the common display channel. A different program may be substantially simultaneously selected on another display device in the same manner by the generation of a different control signal frequency in response to a different associated command signal. The plurality of initially demultiplexed program information signals may be a digital time division multiplexed signal, in which instance a digital sampler, such as a recirculating register, may be utilized in conjunction with a comparator to time demultiplex the program information signals and provide the selected program in response to the generation of an unload signal from the comparator as the selection control signal, the output of the sampler being thereafter converted to an analog signal. In addition, the computer and common communication signal path thereto of the communication system may be utilized to provide premises access monitoring, in which instance a pair of input devices, such as a card reader and a door position sensor, provide input conditions to the computer indicative of the status of the door to the premises and the authorization of the entrant, a randomly selected insertable card providing the authorization information to the computer through the reader.

45 Claims, 9 Drawing Figures

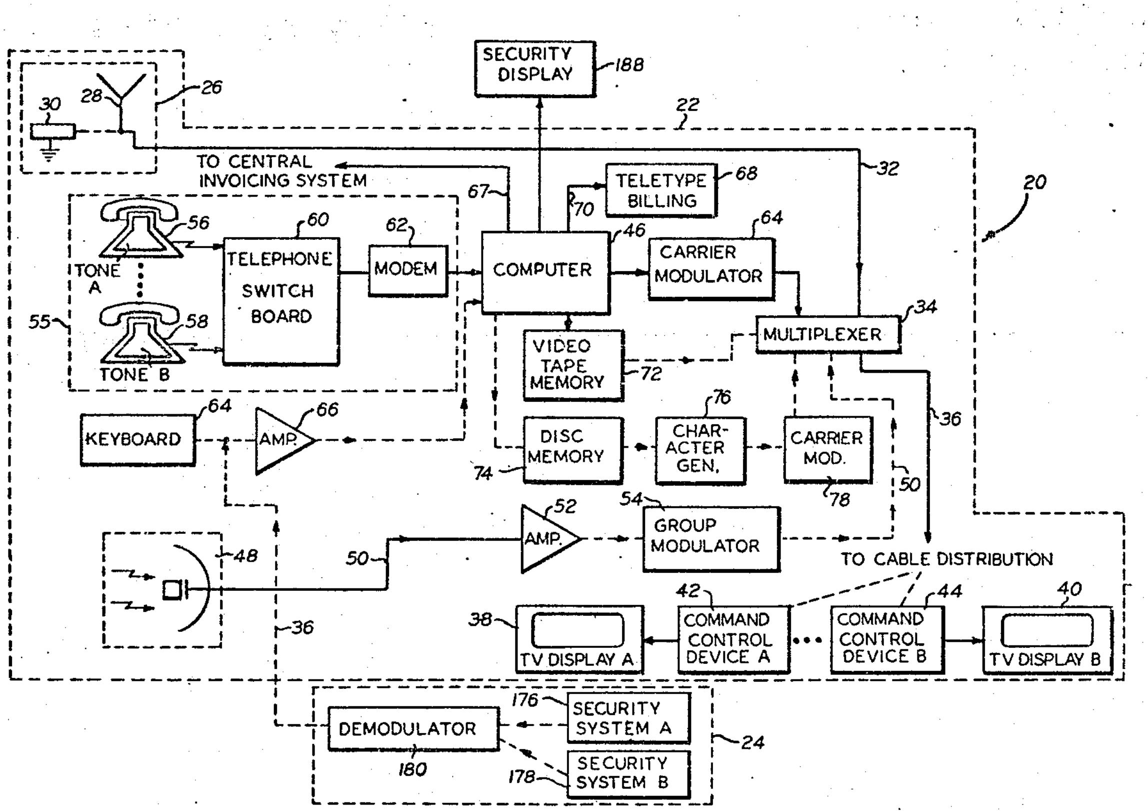
SECURITY DISPLAY
188
22
26
30
28
TO CENTRAL INVOICING SYSTEM
32
20
67
TELETYPE BILLING
68
70
56
60
62
64
46
TONE A
TELEPHONE SWITCH BOARD
MODEM
COMPUTER
CARRIER MODULATOR
34
55
58
MULTIPLEXER
TONE B
VIDEO TAPE MEMORY
72
76
KEYBOARD
64
66
AMP.
36
DISC MEMORY
CHAR-ACTER GEN.
CARRIER MOD.
74
50
78
52
54
AMP.
GROUP MODULATOR
48
50
TO CABLE DISTRIBUTION
42
44
40
36
38
TV DISPLAY A
COMMAND CONTROL DEVICE A
COMMAND CONTROL DEVICE B
TV DISPLAY B
176
DEMODULATOR
SECURITY SYSTEM A
24
180
178
SECURITY SYSTEM B

COMMUNICATION SYSTEM

BACKGROUND OF THE INVENTION

1. Field of the Invention

The present invention relates to communication systems and such systems in which both subscription program information and premises surveillance information is provided.

2. Description of the Prior Art

Subscription communication systems, such as those which are commonly provided under the same "pay TV systems" are well known. These systems, however, have not enjoyed the widespread acceptance which was originally contemplated therefor due to considerable problems associated with insuring the security of the pay TV signal as well as attempting to provide a diverse enough selection to interest potential subscribers. With the advent of cable television, commonly known as CATV, subscription television has become more popular although still being unable to provide a larger diversity than the number of unused VHF channels on a commercial television set which, in an area like New York City, consists of only channels 3, 6, 8, 10 and 12. Thus, at best, a selection of only five simultaneously transmitted pay TV programs can be provided, assuming, as is the usual case, the subscriber also wishes to receive the "free TV," normally transmitted over the remaining channels.

Such program capacity enhancement CATV systems are exemplified by U.S. Pat. Nos. 3,581,209 and 3,562,650 which disclose CATV program capacity enhancement systems. In these systems, an entire band or group of transmitted signals is simultaneously converted to the unused band of television channels. However, only one program is transmitted over one channel, a separate channel being required for each of the transmitted pay TV programs. Thus, since the signals are group converted, these systems are restricted to the number of unused channels available on the subscriber's television set.

In addition, subscription television systems, such as that disclosed in U.S. Pat. Nos. 3,230,302 and 3,278,677, wherein central control of a plurality of subscribers' television sets is provided, require that each subscriber have his own unique command channel frequency. This provides an undesirable limitation on the number of subscribers. Furthermore, some prior art systems, such as that disclosed in U.S. Pat. No. 3,230,302, merely provide monitoring of subscriber program selection for subsequent billing. There is no positive control of subscriber program selection. Thus, such prior art systems normally require remote location of a monitoring unit or security unit so as to ensure the security thereof.

In addition, the majority of presently available prior art subscription television systems require modification of the subscriber's TV receiver, such as for use with a coin box control. An example of such a system is disclosed in U.S. Pat. No. 3,355,546. Thus, these undesirable limitations on subscription television systems have contributed to restricting the growth of this market.

These disadvantages of the prior art are overcome by the present invention.

SUMMARY OF THE INVENTION

A communication system by which a plurality of substantially simultaneously transmitted different subscription programs may be selectively individually displayed on a common display channel is provided. Each of the subscription programs preferably has a different associated frequency which is also different from the associated frequency of the common display channel. A multiplexed communication signal contains a plurality of different program information signals of different frequencies and a plurality of command signals and is received by a plurality of display devices which are capable of displaying different selected subscription program information displays from the plurality of such signals in response to selected program information signals. The communication signal path acts as a common communication path for both the program information signals and the command signals.

Each display device has an associated control means for controlling the selection of the programs. This control means is connected to a common condition responsive means, such as a computer which supervises the program selection and preferably automatically bills for such selection on a program by program basis. The control means includes demultiplexer means for separating the multiplexed communication signal into the pluraltiy of program information signals and the plurality of command signals, and associated program information selection control signal generating means operatively connected to the signals separation means for providing a program selection control signal in response to an associated unique command signal from the computer. The control means further includes an associated signal operating means operatively connected to the signal separating means and the program selection control signal generating means for operating on the plurality of subscription program information signals with the associated program selection control signal for providing one of the selected program information signals to the display means at the associated common display signal frequency. Thus, the control means demultiplexes the communication signal and generates a program information selection control signal in response to a uniquely identified command signal.

A digital frequency synthesizer, such as one employing a crystal reference oscillator and a phase locked loop having a voltage controlled oscillator therein, is preferably utilized to generate the control signal at a frequency which, when mixed with the demultiplexed plurality of program information signals, will provide the selected program at the frequency of the common display channel. A different program may be substantially simultaneously selected on another display device in the same manner by the generation of a different control signal mixing frequency in response to a different associated unique command signal detected by the display device associated control means.

The plurality of subscription program information signals may also comprise a digital time division multiplexed signal in which instance a digital sampler, such as a recirculating register, may be utilized in conjunction with a comparator to time demultiplex these program information signals and provide the selected program in response to the generation of an unload signal from the comparator as the selection control signal. The digital output of the sampler, which is the selected program, is thereafter converted to an analog signal, such as by a digital-to-analog converter utilizing a flip-flop memory hold circuit. If the communication system is utilized for subscription or pay television, the video portion of the program information may be provided via a frequency multiplexed signal which is demultiplexed and the appropriate program video portion selected by means of manually tuning to an oscillator having the appropriate mixing frequency which when mixed with the plurality of video information signals will provide the selected signal at the frequency of the common display channel. The audio portion of such a signal may be the above digital time division multiplexed signal and the appropriate audio information signal corresponding to the selected program video information signal may be selected in the manner previously described above with reference to sampling of the plurality of time division multiplex program information signals. Thereafter, the audio information signal is combined with the selected program video information signal to provide the selected composite program information signal at the common display channel frequency.

In addition, the system computer and its associated common communication signal path to the associated control means may be further utilized to provide premises access monitoring in addition to program selection. In such instance, preferably a pair of input devices, such as a card reader and a door position sensor provide input conditions to the computer indicative of the status of the door to the premises and the authorization of the entrant. A randomly selected insertable card having an authorization code or identity code encoded thereon provides the identity authorization information to the computer through the card reader. If the door position sensor provides an input condition to the computer indicating that the door has been opened and the identity code read into the computer by the card reader does not match a predetermined identity code randomly assigned to the particular premises being monitored, an alert signal is provided.

DETAILED DESCRIPTION OF THE PREFERRED EMBODIMENTS

Figure 1:
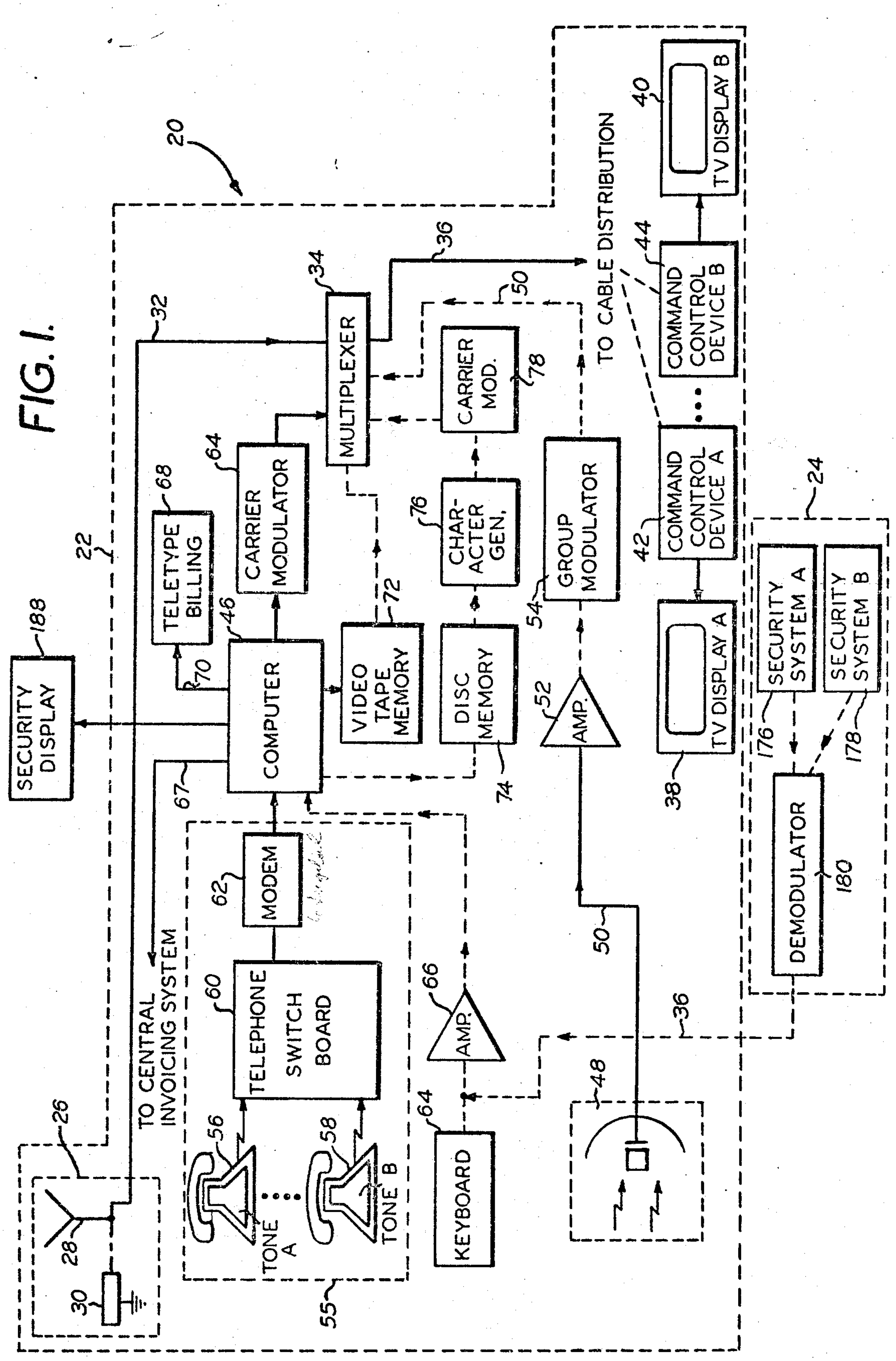
FIG. 1 is a block diagram of the overall system of the present invention.

Referring now to the drawings in detail and especially to FIG. 1 thereof, a block diagram of the overall preferred communication system, generally referred to by the reference numeral 20, of the present invention is shown. The communication system 20 shown in FIG. 1 includes both a secure subscription communication portion, generally referred to by the reference numeral 22, and a premises access monitoring system, generally referred to by the reference numeral 24. As will be explained in greater detail hereinafter, if desired, the communication system 20 of the present invention may preferably include only the secure subscription communication system portion 22 or only the premises access monitoring portion 24, or both, depending on the desired utilization of the communication system 20. For purposes of explanation, the communication system 20 shall be described as including both the secure subscription communication portion 22 and the premises access monitoring portion 24, although, it is to be understood, that one of these portions may be omitted without departing from the scope of the present invention.

The secure subscription communication portion 22 of the present invention is preferably a subscription television communication system, although other communication media may be employed in the system 22 of the present invention without departing from the spirit and scope thereof. However, the secure subscription communication system of the present invention shall be described in terms of its preferred communication media which is television. The preferred secure subscription communication system 22 preferably includes a conventional program information signal input 26, such as a conventional television antenna 28 or a conventional cable television input 30. As will be explained in greater detail hereinafter, this conventional input 26 preferably provides normal television programming such as "free" TV or the presently available cable television service associated with the television distribution system being utilized. This normal program information is fed via a signal path 32 to a conventional multiplexer 34 whose output is connected, via a signal path 36, to the conventional cable distribution system associated with the television of the subscribers receiving this service. By way of example, and not by way of limitation, two such television subscribers 38 and 40, respectively, designated TV display A and TV display B, respectively, are associated with the cable distribution network, although, if desired, any number of subscribers could be connected to the cable distribution network.

Preferably, the subscribers' television display devices 38 and 40 are operatively connected to the cable distribution network via command and control means 42 and 44, respectively, to be described in greater detail hereinafter with reference to FIGS. 2 through 6, and, alternatively, FIGS. 7 and 8. The secure subscription communication system 22 of the present invention also preferably includes a centralized common condition responsive network which is preferably a computer 46 such as a NOVA 1200 computer manufactured by Data General Inc. As will be described in greater detail hereinafter, this computer 46 acts as a supervisory means for supervising program selection of subscription television programs, billing for these programs, and as an integral part of the premises access monitoring system portion 24 for providing alerts of unauthorized entry to monitored premises. The subscription communication information is preferably provided to the secure subscription communication system 22 via conventional means such as laser beam transmission in conjunction with a conventional optical receiver 48 therefor, illustratively shown in FIG. 1, such a laser beam communication system being described, by way of example, in greater detail in U.S. patent application Ser. No. 142,331, filed May 11, 1971 and entitled SUBSCRIPTION COMMUNICATION SYSTEM, and assigned to the same assignee as the present invention, the subject matter of which is hereby specifically incorporated by reference herein in its entirety.

If desired, any other conventional manner of providing a subscription communication signal to the system of the present invention may be utilized, such as via microwave transmission or via signals transmitted via high frequency telephone lines. For purposes of illustration, we shall describe the transmitted subscription communication signal as being a laser beam received by optical receiver 48. This received signal preferably includes a plurality of different programs each separated, such as by frequency, from each other. Furthermore, each of these programs is preferably at a frequency which is different from that of the associated frequency of the common display channel on the television receivers 38 and 40 over which the subscription program information is to be displayed. This received signal comprising a plurality of program information signals is preferably provided via signal path 50 through a conventional amplifier 52 to a conventional group modulator 54 which preferably modulates the entire group band of program information signals so as to convert these received signals as a group from the laser modulated frequencies to compatible television frequencies such that these signals will not be displayed on the television receivers 38 and 40 unless a selected program is converted to the appropriate display channel frequency, as will be described in greater detail hereinafter. The output of the group modulator 54 is provided to the conventional multiplexer 34 where it is multiplexed with the conventional television input provided via signal path 32.

A program selection input condition is provided to the computer 46 via a conventional program selection means. Preferably, the computer 46 is a digital computer and, accordingly, the input signal provided thereto is preferably a digital signal. By way of example, a conventional tone generator 56 and 58, respectively, is associated with each of the television display devices 38 and 40, respectively. As shown and preferred in FIG. 1, these tone generators may be conventional touch-tone telephones 56 and 58 located at the premises where the subscriber's television receiver 38 and 40, respectively, is located. In the example shown, the tone output of the telephones 56 and 58 is conventionally supplied to a conventional telephone switchboard 60 and therefrom through a conventional modem 62 which converts the telephone signals to computer compatible digital signals, to the input of the computer 46 for providing the program selection information signals thereto. If desired, any other program selection means 55 could be utilized in place of the tone generation means, such as a conventional keyboard device 64 or a conventional card reader device. Such an optional keyboard 64 as is shown in FIG. 1 where the output of the keyboard 64 is operatively connected to the computer 46 through a conventional amplifier 66.

As was previously mentioned, and as will be described in greater detail hereinafter, the output of computer 46 is preferably a plurality of command signals which are utilized for selecting the appropriate desired program information signal from the plurality of subscription program information signals provided via path 50. A conventional carrier modulator 64 is connected to the command signal output of computer 46 for modulating the digital signal output of the computer 46 onto a radio frequency (RF) command frequency. The output of this carrier modulator 64 is provided to the multiplexer 34 where it is multiplexed together with the conventional television input provided via path 32 and the subscription television input provided via path 50 to provide a multiplexed communication signal containing a plurality of different program information signals and a plurality of command signals, via path 36, to the cable distribution network and, therefrom, through the associated command control devices 42 and 44, respectively, to their associated conventional television display devices 38 and 40, respectively.

As will be described in greater detail hereinafter, if desired, the computer 46 may also provide an output to a central invoicing system via a path 66 for centralized billing purposes and an output to a conventional teletype 68 via a path 70 for local teletype billing. Furthermore, if desired, as will be described in greater detail hereinafter, the computer 46 may have an associated conventional videotape memory device 72 capable of providing videotape information to the multiplexer 34 which is multiplexed with the other input signals thereto for providing a "special" type of information display on the conventional television display monitors 38 and 40. In addition, computer 46 also has an associated conventional disc memory device 74 whose digital output is supplied via a conventional character generator 76 through a conventional carrier modulator 78 which modulates the video information onto an RF carrier of an unused video channel to supply an information signal to multiplexer 34 where it is multiplexed with the other input sigals to provide "special" program information, as will be described in greater detail hereinafter.

"COMMAND CONTROL NETWORK"

Referring now to FIGS. 2 through 6, a typical preferred command control network, such as a command control network 42 or 44 shown in FIG. 1 in block form, will be described in greater detail hereinafter, all such associated networks preferably being identical. Preferably, this typical command and control network 42 will be described in terms of the preferred embodiment wherein the program information signals and the command signals are combined in a frequency multiplexed signal by multiplexer 34 and thereafter transmitted to the cable distribution network via path 36 and, therefrom, to the associated command and control networks or devices 42 and 44. As will be described in greater detail hereinafter, if desired, this signal may be a time division multiplexed signal or have a portion thereof as a time division multiplexed signal wherein the associated command control networks may preferably be as described with reference to FIG. 8.

Figures 2, 7:
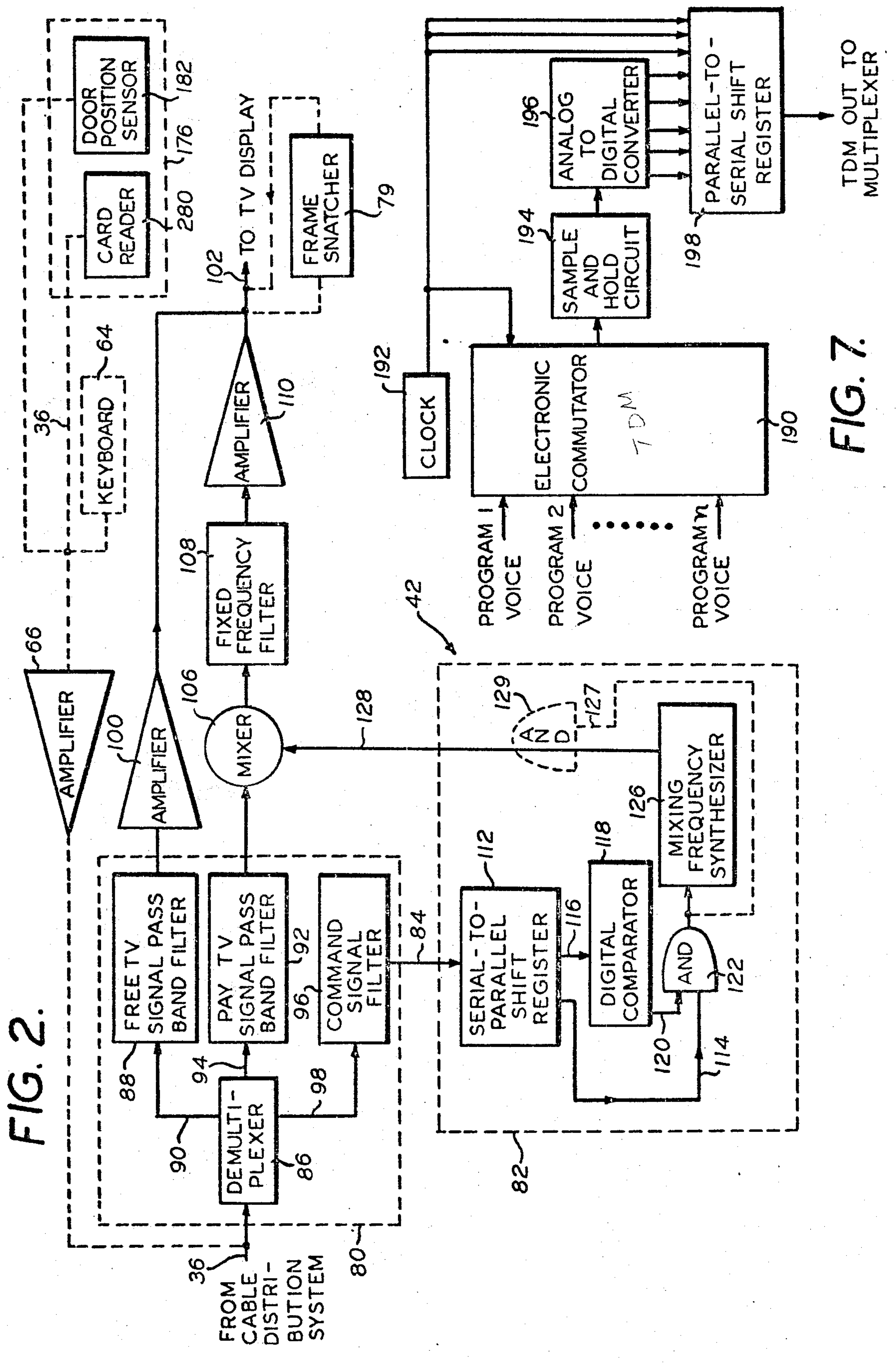
FIG. 2 is a block diagram of a typical command control device associated with the embodiment shown in FIG. 1.
FIG. 7 is a partial block diagram of an alternative embodiment for providing a time division multiplexed signal to the system of FIG. 1.

Referring now to FIG. 2, the command and control network 42 preferably includes a signal separation portion 80 which is operatively connected to the cable distribution system via path 36 and a frequency selection control signal generating portion 82 which is operatively connected to the signal separation portion 80 via signal path 84. The signal separation portion 80 preferably includes a conventional demultiplexer 86 which demultiplexes the frequency multiplexed signal provided from multiplexer 34 and provides this demultiplexed signal to a "free TV" signal pass band filter 88 via signal path 90, a "pay TV" signal pass band filter 92 via signal path 94, and a command signal filter 96 via signal path 98. Filters 88, 92 and 96 are preferably conventional pass band filters which respectively pass the frequency band of signals which are the conventional normally used television channels whose frequencies are those conventionally associated with channels 2 through 13 ("free TV" signals), the band of television signals associated with the subscription or pay TV programs which preferably fall within a band of frequencies outside those of the normally used conventional television channels ("pay TV" signals) and the frequency band of signals associated with the command signals which signals are outside the frequency ranges of both the "free" television signals and the "pay" television signals. The output of the "free" TV signal pass band filter 88 is operatively connected to a conventional amplifier 100 whose output is connected to the input of the conventional TV display device, such as device 38 associated with command network 42, via signal path 102. The output of the "pay" TV signal pass band filter 92 is connected to one input of a two input conventional mixer 106 whose output is operatively connected via display signal path 102 to the input of a conventional fixed frequency filter 108 which is preferably a notch filter designed to pass only signals having the frequency of a single common display channel which is preferably utilized for display of subscription television programming. The output of the filter 108 is operatively connected through the conventional amplifier 110 to the input to the conventional television display device 38.

The output of the command signal filter 96 provided via path 84 is preferably connected to the input of a command signal decoder which is preferably a conventional shift register 112. Preferably, as will be described in greater detail hereinafter, the command signal is a serial bit digital signal and the shift register 112 is a conventional serial-to-parallel shift register for separating this digital signal into a command portion, which is a digital signal provided via path 114, and an identity portion, which is a digital signal provided via path 116. Preferably, each command control network has a unique identification code associated therewith for determining when the particular command and control network is addressed by the computer 46. These unique identity codes are contained in the identifier portion of the command signal provided via path 116 from register 112. This signal is preferably provided via path 116 to the input of a conventional digital comparator 118 which compares the identifier portion of the command signal with the unique identity code address of the control network to generate an enable signal therefrom via path 120 when the identifier portion of the signal matches the unique identity code associated with the particular command control network. The command portion of the signal provided via path 114 from register 112 is preferably provided to the input of a conventioanl AND gate 122 whose enable signal input provided via path 120 results from the provision of the proper unique identity code signal via path 116 to digital comparator 118. The output of the AND gate 122 is the command signal information portion which is preferably provided via path 124 to the input of a digital mixing frequency synthesizer network 126 shown in greater detail in FIGS. 3 through 6 and to be described in greater detail hereinafter with reference thereto. The output of the digital mixing frequency synthesizer 126 is a frequency selection control signal which is preferably provided via signal path 128 to the other input of mixer 106 and is a signal having a frequency such that when this signal is mixed with the plurality of subscription program information signals provided to mixer 106 at frequencies other than the common display channel frequency, results in the provision of the selected subscription program information signal at the frequency of the common display channel, the other signals being filtered out by fixed frequency filter 108 thereafter. As will be described in greater detail hereinafter, the timing control for the provision of the frequency selection control signal is preferably directly controlled by the computer 46 by controlling the time at which and during which the computer 46 provides the command signal. However, if desired, alternatively the computer 46 may provide a separate timing signal portion as part of the command signal which timing signal portion may be provided via path 127 and utilized to enable an AND gate 129 whose information input is the output of synthesizer 126.

"FREQUENCY SELECTION CONTROL SIGNAL GENERATION"

Figures 3, 4A, 4B, 5, 6:
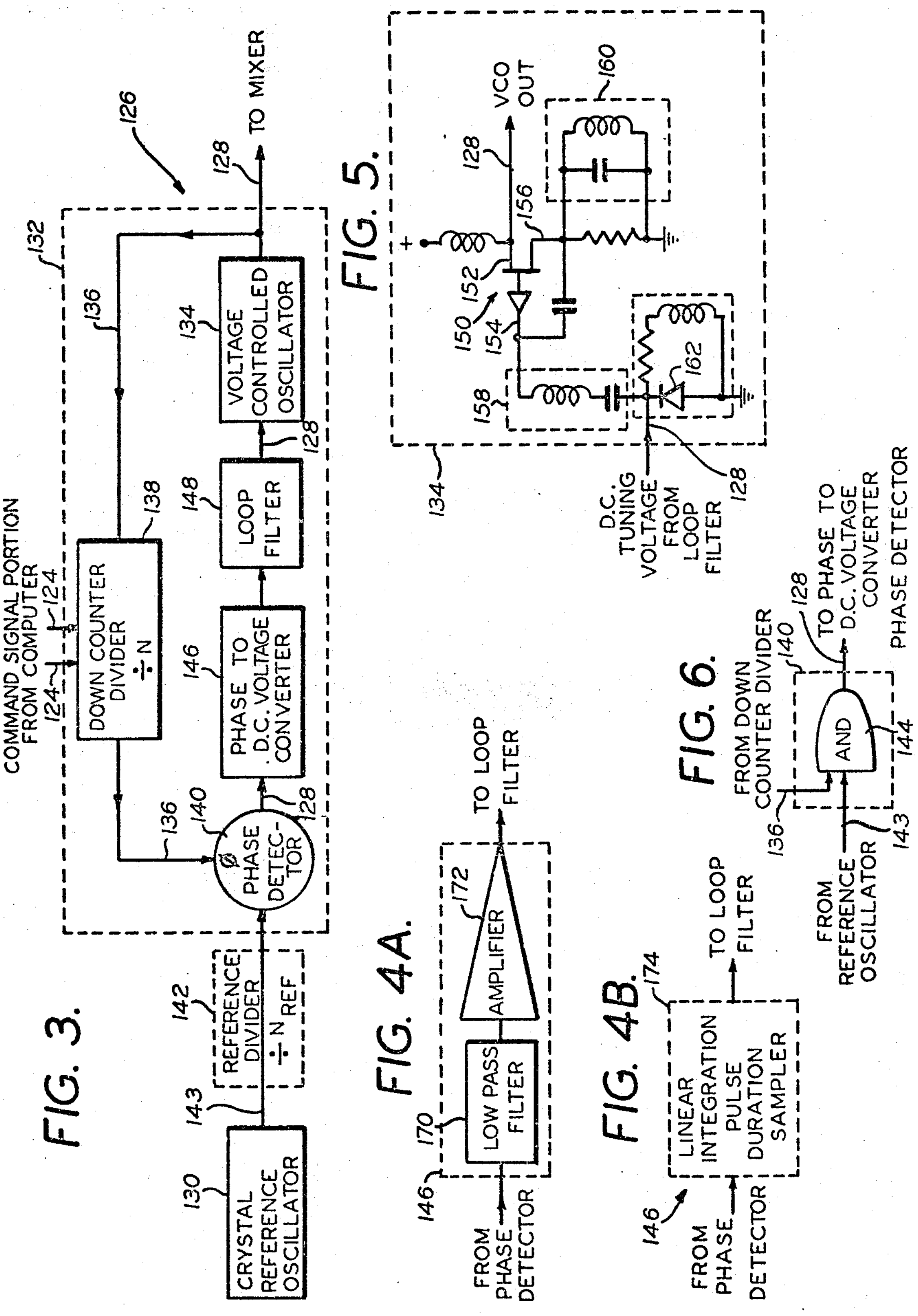
FIG. 3 is a block diagram of a typical mixing frequency synthesizer portion of the embodiment shown in FIG. 2.
FIGS. 4A and 4B are block diagrams of typical alternative embodiments of the phase-to-DC voltage converter portion of the embodiment shown in FIG. 3.
FIG. 5 is a schematic diagram of a typical voltage controlled oscillator portion of the embodiment shown in FIG. 3.
FIG. 6 is a logic diagram of a typical phase detector portion of the embodiment shown in FIG. 3.

Referring now to FIG. 3, a typical preferred digital frequency synthesizer 126 is shown. As shown and preferred, the digital frequency synthesizer 126 preferably includes a reference oscillator 130 whose output is provided to a conventional phase locked loop network 132 for providing a mixing frequency signal to mixer 106 via path 128. The choice of reference oscillator 130, which constitutes the precision frequency standard of the system, is preferably dictated by the frequency accuracy and spectrum desired, the number of channels required, the allowable acquisition time, and the spurious suppression specifications. Most preferably, the reference oscillator 130 is a highly stable oscillator, such as a quartz crystal oscillator or, if desired, a tuning fork oscillator. The phase lock looped portion 130 of the synthesizer 126 preferably includes a conventional voltage controlled oscillator 134, such as a conventioanl Clapp oscillator shown in FIG. 5, by way of example, which is tuned over the desired mixing frequency range by means of the phase locked loop. The frequency selected for the output of the voltage controlled oscillator 134 is held fixed, in the example shown, with crystal accuracy through the feedback system in the servo loop which, as shown and preferred, is a digitally variable feedback system, via feedback path 136.

The command information portion of the command signal provided via path 124 to the synthesizer 126 is preferably a parallel bit digital signal and is preferably operatively connected to the input of a conventional digital frequency divider 138 having a variable division ratio represented by "÷ N", the division ratio being varied in accordance with the command information provided via path 124. Preferably, the digital frequency divider 138 is a conventional down counter such as one comprising a plurality of flip-flops. The feedback frequency output of divider 138 provided via feedback path 136 is provided as one input to a two input conventional phase detector network 140 whose other input is the output of the reference oscillator 130. Preferably, the output of the reference oscillator 130 corresponds to the required phase detector frequency, which is the frequency spacing between adjacent program information signals comprising the subscription communication signal band.

If desired, another conventional difference frequency divider network, having a fixed division ratio, may be utilized between the reference oscillator 130 and the phase detector 140 if the frequency of the reference oscillator 130 is not at the value of the desired phase detector frequency. The phase detector 140, as shown and preferred in FIG. 6, is preferably a digital phase detector, such as a conventional AND gate 144 whose output is proportional to the phase difference between the reference oscillator signal (in digital form) and the feedback frequency signal from divider 138. The output from divider 138. The output of the conventional phase detector 140 is operatively connected via path 128 to the input of a conventional phase-to-DC voltage converter 146 which converts this phase difference output signal to a DC voltage which is utilized to control the frequency of the voltage controlled oscillator 134, which preferably has a variable frequency output. The output of the phase-to-DC voltage converter 146 is preferably connected through a conventional loop filter network 148, which, as will be described in greater detail hereinafter, preferably provides the proper pull-in and hold-in phase loop characteristics together with the gain control of the converter 46, to the oscillator 134. This DC voltage output is utilized to tune the voltage controlled oscillator 134.

By way of example, referring to FIG. 5, a Clapp type voltage controlled oscillator 134 preferably includes a conventional field effect transistor 150 having a source electrode 152, a gate electrode 154 and a drain electrode 156. A conventional series resonant tuning circuit 158 is operatively connected to the gate electrode 154 and a conventional parallel resonant tuning circuit 160 is operatively connected to the drain electrode 156. A conventional varactor 162 is operatively connected to tuning circuit 158 and the DC voltage input provided via path 128 electronically varies the capacitance of varactor 162 which, thus, changes the capacitance of tuning circuit 158 thus retuning oscillator 134 so as to change the frequency of oscillation. If desired, the voltage controlled oscillator 134 could be any other type of conventional voltage controlled oscillator such as a Wien bridge oscillator or a relaxation oscillator, such as one employing a Shockley diode.

With respect to the phase-to-DC voltage converter 146, any conventional means for conversion of the phase signal to a DC voltage may be utilized; however, such converter 146 should preferably be of the type which provides a substantially stable DC voltage as a result of this conversion. One such conventional converter 146 is shown in FIG. 4A in which a conventional low pass filter network 170 is operatively connected to an amplifier 172, the low pass filter passing only the DC component of the input signal and attenuating the high frequency components, the low pass filter network 170 preferably containing sufficient sections of low pass filtering and rejection filtering at each of the undesired frequencies in the digital input signal, such as the phase detector frequency and the harmonics thereof, so as to minimize variations in this resultant DC voltage as variations therein can lead to undesirable frequency modulation of the voltage controlled oscillator 134.

As shown and preferred in FIG. 4B, the phase-to-DC voltage converter 146 is preferably a linear integration pulse duration sampler network 174 which provides a DC signal without AC components. The operation of this network 174 will be described in greater detail hereinafter.

"PREMISES ACCESS MONITORING SYSTEM"

Referring once again to FIGS. 1 and 2, the premises access monitoring system 24 is shown in block form. As shown and preferred, a security system input device 176 and 178 is respectively associated with each of the plurality of television display devices 38 and 40 in the example shown, and is preferably located in each of the respective premises where the television display devices 38 and 40 are located. The respective outputs of the security systems 176 and 178 are fed to a conventional demodulator 180 which demodulates the RF signal to a digital carrier and, therefrom, through the conventional cable distribution network associated with the television display devices 38 and 40 and through the two-way communication signal path 36 to the input of the computer 46 where this input information is processed in a manner to be described in greater detail hereinafter to provide premises access monitoring.

As shown and preferred in FIG. 2, each typical security system 176 or 178, security system 176 being shown by way of example in FIG. 2, all of the associated security systems preferably being identical, preferably includes a conventional identity input device, such as a conventional card reader 280 for reading a randomly coded card having a randomly assigned digital code imprinted thereon which information is input to the computer 46 over the communication signal path, and a conventional access status monitoring means such as a conventional door position sensor 182, such as a conventional microswitch operated by position sensor attached to the door to the premises being monitored, the door position sensor 182 monitoring the condition of the door and transmitting a signal via the communication signal path to the computer 46 each time the associated door is opened. Thus, both the card reader 280 which reads the identification card inserted therein and the door position sensor 182 which monitors the status of the door to the premises, provide input conditions to the computer 46 indicating both the identity of the entrant to the premises and an indication that the premises have been entered. The associated control network, network 42 in the example being described, provides the unique identity code associated with the particular premises to the computer 46 as another input condition thereto. The computer 46 compares the identity code of the entrant with the authorized identity code assigned to these premises and stored in the computer 46 memory. If the identity codes do not match then the computer 46 provides an alert signal such as an audio-visual signal to a conventional security display device 188 which preferably sounds both an aural alarm and displays the room number of the premises which have been entered without proper authorization. The operation of this premises access monitoring system 24 will be described in greater detail hereinafter.

"ALTERNATIVE EMBODIMENT — COMMAND CONTROL NETWORK"

Figure 8:
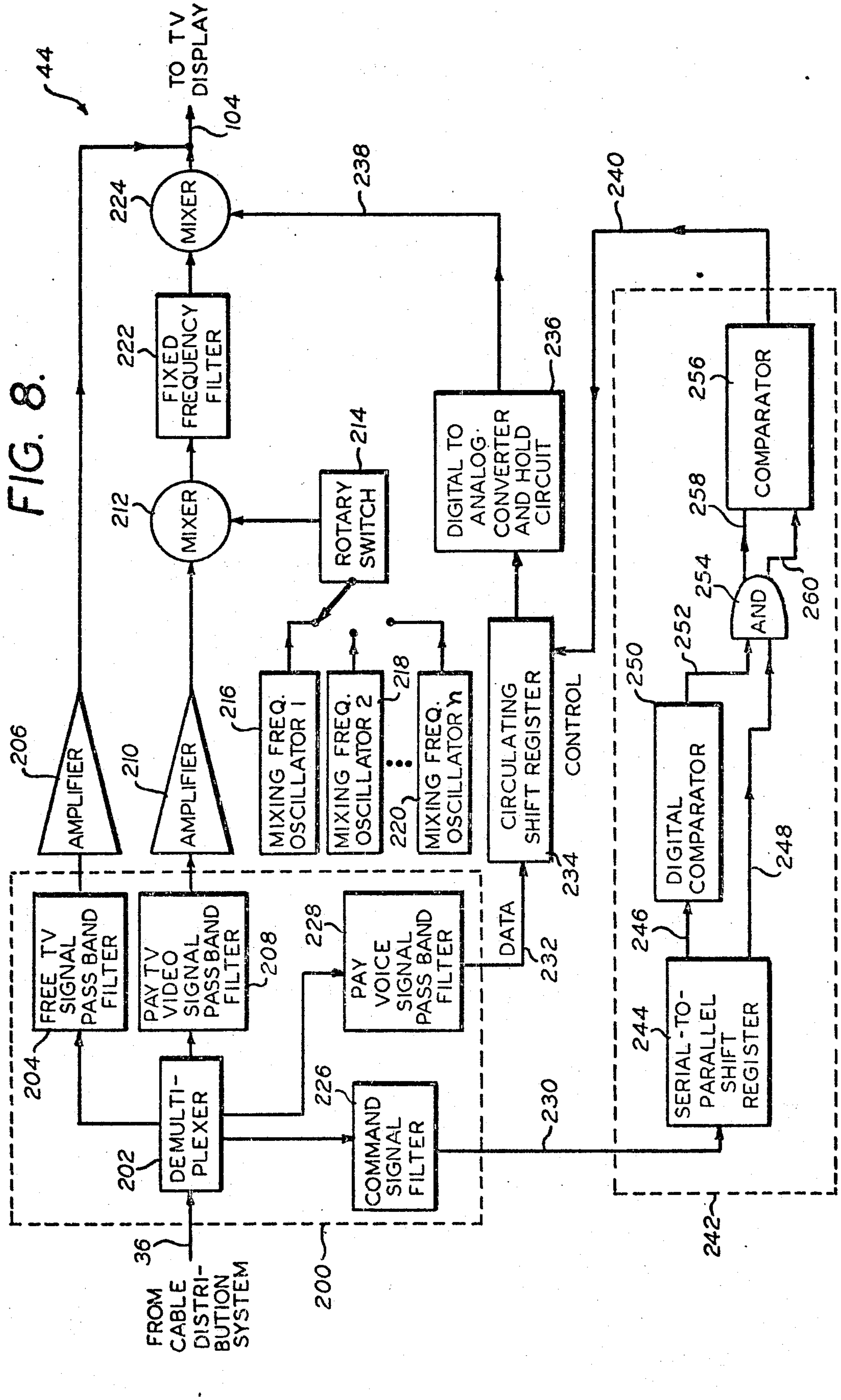
FIG. 8 is a block diagram of an alternative embodiment of a typical command control device for use with the system of FIG. 1.

Referring now to FIGS. 7 and 8, an alternative embodiment of the typical command control network 42 of the present invention is shown. By way of example, we shall assume that the subscription television program information is transmitted segregated into a band of video signal portions and a band of audio signal portions, each audio signal portion corresponding to a single particular video signal portion so as to constitute a composite program information television signal when the corresponding video and audio portions are combined. FIG. 7 depicts, by way of example, a typical preferred manner of creating a time division multiplexed signal consisting of the audio portions of the program information television signals. As shown and preferred in FIG. 7, the associated audio portions labeled "Program 1 voice" through "Program n voice" are provided to a conventional electronic commutator 190 such as the type manufactured by Texas Instruments and designated SN 74150. A conventional clock 192 signal is provided to the electronic commutator 190 or electronic switch so as to synchronize the operation thereof. The output of the electronic commutator 190 is a time division multiplexed signal with each of the program information audio portions being contained in a particular associated time segment synchronized with clock 192. The output of electronic commutator 190 is operatively connected to a conventional sample and hold circuit whose output is, in turn, connected to a conventional analog-to-digital converter 196 for converting the analog time division multiplexed signal to a parallel bit digital signal. The clock signal output of clock 192 is also preferably a parallel bit binary code. The parallel bit output of the analog-to-digital converter 196 is preferably operatively connected, together with the parallel bit output of clock 192, to the input to a conventional parallel-to-serial shift register 198 whose output is a serial bit digital time division multiplexed signal which is provided to multiplexer 34 via signal path 50. Preferably, six bits of time provides 64 possible channels and ten bits of voice or audio give a 1000:1 dynamic range per channel.

Referring now to FIG. 8, a typical command control network for providing subscription communication program selection wherein a time division multiplexed signal and a frequency multiplexed signal contain the subscription communication information is shown. For purposes of illustration, it will be assumed that the program information signals are composite signals having both a video portion and an audio portion, as was previously mentioned with reference to the discussion of FIG. 7. Preferably, the video portions of the subscription program information signals are provided as a frequency multiplexed signal and the audio portions of the subscription program information signals are provided as a time division multiplexed signal. The communication signal, which is a multiplexed signal, is preferably composed of a plurality of command signals, the "free" television signals, a frequency multiplexed plurality of program information video signal portions and a time division multiplexed plurality of program information signal audio portions.

It should, of course, be understood that, if desired, the entire composite program information signal could be transmitted as a time division multiplexed signal instead of as separate audio and video portions as being described in the example hereinafter. In such instance, the composite time division multiplexed program information signal plurality could be operated on in the same fashion as described hereinafter with respect to the time division multiplexed program information signal audio portion plurality.

Referring now to FIG. 8, a typical command control network, such as network 44, capable of providing subscription program selection wherein the subscription program information signal audio portions are contained in a time division multiplexed signal and the subscription program information video signals are contained in a frequency multiplex signal, is shown. As was previously mentioned with reference to FIG. 1, the input to the command control network 44 is provided via the cable distribution system associated with the various television display devices 38 and 40, by way of example, which is operatively connected to multiplexer 34 via path 36. This multiplexed communication signal is provided to a signal separation means 200 via the cable distribution system. More particularly, the multiplexed communication signal is supplied to a conventional demultiplexer 202 which initially demultiplexes the communications signal. The initially demultiplexed communication signal is supplied to a conventional "free TV" signal pass band filter 204 which passes only the "free TV" signals which are preferably contained in the frequency band pertaining to the normally used conventional television channels. These signals are passed through a conventional amplifier 206 and therefrom to the associated television display device 40 via signal path 104. Demultiplexer 202 also provides the initially demultiplexed communication signal to another conventional pass band filter 208 which is preferably designed to pass only the band of frequencies associated with the subscription or "pay" television video signal portions, which signals are preferably in a frequency range other than that of the normally used television channels. The output of the "pay TV" filter 208, which is a frequency multiplexed plurality of video signal portions, is provided through a conventional amplifier 210 to a conventional mixer 212 as one input thereto.

As shown and preferred in FIG. 8, selection of the desired program information signal video portion is accomplished manually by means of a conventional rotary switch 214 and a plurality of conventional mixing frequency oscillators, three such oscillators 216, 218 and 220 being shown by way of example. Each of the associated mixing frequency oscillators 216, 218 and 220 preferably provides a mixing signal at a frequency which when mixed with the plurality of program information signal video portions supplied to mixer 212 will provide the selected program information signal video portion at the frequency of the common display channel, which frequency is preferably different from both the mixing frequency and the pre-mixing frequencies of the program information signal video portions. The output of rotary switch 214, which is the selected mixing frequency signal, is supplied to the other input of mixer 212. The output of mixer 212 is preferably operatively connected to a conventional fixed frequency filter 222, such as a notch filter designed to pass only signals at the frequency of the common display channel and to reject all other signals. The output of the fixed frequency filter 222, which is the selected program information signal video portion, is supplied to one input of another conventional mixer 224 for mixing with the appropriate selected corresponding audio portion thereof to provide the composite selected program information signal to the associated TV display device 40 via path 104.

The selection of the proper associated program information signal audio portion shall now be described. The initially demultiplexed communication signal output of demultiplexer 202 is also supplied to a conventional command signal filter 226 and a conventional subscription or "pay" program information signal audio portion pass band filter 228. Each of these filters is preferably designed to pass only the command signals (filter 226) and the audio portions of the program information signals (filter 228), respectively. As was previously mentioned, the audio portions of the program information signals are preferably contained in a time division multiplexed signal having an associated frequency band which is different from the associated frequencies of the normally used conventional television channels, as is the frequency range assigned to the command signals. Thus, the output of the command signal filter 226, which is provided via path 230, comprises solely the plurality of command signals and the output of filter 228, which is provided via path 232, comprises solely the time division multiplexed subscription program information signal audio portion plurality.

The time division multiplexed program information signal voice or audio portions, as was previously mentioned with reference to FIG. 7, are preferably provided as a serial bit digital signal. The time division multiplexed digital signal output of filter 228 is, therefore, preferably operatively connected to a digital sampling means, such as a circulating shift register 234, via path 232 for demultiplexing the time division multiplexed digital signal to provide a digital signal output which corresponds to the selected program information signal audio portion. The output of the conventional circulating shift register 234 is preferably operatively connected to a conventional digital-to-analog converter and hold network 236, such as one utilizing JK flip-flops for memory between samples which control the output level in conjunction with a binary scaling resistor ladder network. The output of the digital-to-analog converter and hold network 236, which stores the information between samples, operatively connected via path 238 to one input to mixer 224, this audio information signal portion being provided to mixer 224 via signal path 238. The selected audio portion is combined in mixer 224 with the selected video portion of the selected program information signal to provide a composite selected program information signal to the associated television display device 40 via path 104.

The circulating shift register 234 is controlled by means of an unload control pulse provided via path 240 from a frequency selection control signal generation network 242 wherein the frequency selection control signal is the unload pulse provided to the circulating shift register 234, this pulse operating on the time division multiplexed digital signal to provide the selected program information signal audio portion.

It should be understood that throughout the specification and claims the term "operating on" can be utilized in an analog or digital fashion such as in mixing (FIG. 2) or gating (FIG. 8). As long as the resultant output is dependent upon both input signals then each input signal is deemed to be "operating on" the other as defined above.

The frequency selection control signal is provided from the frequency selection control signal generating means 242 as was previously mentioned. Preferably, the frequency selection control signal generating means 242 includes a means for decoding the plurality of command signals provided from command signal filter 226 via path 230. As was previously mentioned with reference to FIG. 2, the command signal preferably includes an identifier portion and a command information portion and is preferably provided to the frequency selection control signal generating means as a serial bit digital signal via path 230. The decoder is preferably a conventional serial-to-parallel shift register 244 which provides a parallel bit output comprising the identifier portion of the command signal via path 246 and the command information portion of the command signal via path 248.

As was also previously mentioned with respect to the description of the embodiment shown in FIG. 2, each command control network 44 preferably has an associated unique identity code so as to be uniquely addressable by the computer 46. The identifier portion of the command signal provided via path 246 is operatively connected to a conventional digital comparator 250 which compares the identifier portion with the unique identity code assigned to the particular command and control network 44 and provides an enable output signal via path 252 only when there is a match; that is, only when the associated command and control network 44 is being addressed by the computer 46. This enable signal is provided to the enable input of a conventional AND gate 254. The other input to gate 254 is the command information portion, which is preferably a parallel bit signal containing time information and command information, the command information indicating the appropriate audio portion of the signal to be selected and the time information indicating a particular time slot in the time division multiplexed signal in which this information is contained. The command information is provided to another conventional digital comparator 256 via path 258 and the time information is provided to the comparator 256 via path 260 to provide a frequency selection control signal sample pulse or unload pulse to shift register 234 via path 240 when the command information signal corresponds to the time information signal indicating that the proper selected program information signal audio portion is present in the circulating shift register 234 for sampling, the register 234 being unloaded to converter-and-hold network 236 when the sample pulse is provided thereto.

It should be noted that the use of a separate demultiplexer 86 (FIG. 2) or 202 (FIG. 8) to initially demultiplex the communication signal prior to the normal demultiplexing function of the associated filters 88, 92 and 96 of signal separation or demultiplexing means 80 or filters 204, 208, 226 and 228 of signal separation means 200 may be omitted, if desired, if the received communication signal can easily be demultiplexed in this fashion. Thus, although demultiplexers 86 and 202 are shown in FIGS. 2 and 8, respectively, they are preferably omitted from the normal command control network.

OPERATION

Now the operation of the communication system 20 of the present invention shall be described, first with reference to the operation of the secure subscription communication system portion 22 when the subscription program information signals are transmitted either as a frequency multiplexed composite signal or as a separate frequency multiplexed video portion plurality and a separate time division multiplexed audio portion plurality from which the appropriate selected portions are subsequently combined into a composite signal, and thereafter with reference to the premises access monitoring portion 24 of the communication system.

As was previously mentioned, the secure subscription communication system 22 of the present invention enables both conventional program information and subscription program information to be displayed on a conventional television display device without the necessity for internally modifying the television device itself. A plurality of subscription programs, such as ten channels, are simultaneously transmitted from a central source, these signals having been transmitted in the embodiment shown in FIG. 2 as a frequency multiplexed signal. For purposes of explanation, it shall be assumed that the system is utilized in an institutional environment such as a hotel. Furthermore, we shall assume that the hotel is in the New York City metropolitan area and channel 6 is utilized as the common display channel for the communication system.

In order to utilize the system 22, the user dials up the computer 46 to select a desired program from the plurality of subscription programs available. If desired, the computer may control a conventional playback tape recorder device which provides a prerecorded voice to the user requesting that he dial in his room number for billing purposes and thereafter dial in the selected program number and time of performance. This "dialing in" is preferably accomplished by means of either keyboard 65 or the conventional touch-tone telephone desk set provided in the room, such as telephone 56. The telephone input information is routed through the conventional switchboard 60 and therefrom through a conventional modem 62 which converts the telephone signals into computer compatible digital signals which are supplied to computer 46. It should be noted that all times when the television 38 or 40 is tuned to channel 6, it preferably receives no television displayed thereover supplied from the conventional cable or master antenna associated with the cable distribution system. The subscription program information signals, as was previously mentioned, are each at different frequencies from each other and from the common display channel frequency, in this instance channel 6, so that when these signals are supplied to the television receiver without any frequency modification, they will not be displayed due to the conventional filtering associated with the television display device. Furthermore, since the subscription program information signals are preferably at frequencies different from any of the television display channels, this information will not be displayable on any of the television channels without modification.

At the appropriate selected time chosen by the user, which has previously been supplied to the computer 46 by the user in the above manner, the computer provides a command signal output which may be a plurality of command signals when more than one television display is to display a selected program at the same time. For purposes of this example, we shall assume that two different subscription programs are to be displayed substantially simultaneously, one on television 38 and the other on television 40. The plurality of command signals provided by computer 46 at the designated time are preferably digital signals which are modulated onto an RF command frequency by modulator 64 prior to being supplied to multiplexer 34 where the "free" television signals supplied via path 32, the subscription program information signal supplied via path 50 and the command signals are multiplexed into a multiplexed communication signal containing these various portions. This signal is supplied through the cable distribution system to the command control networks 42 and 44 associated with the television displays 38 and 40, respectively.

Now the operation of command and control network 42 associated with television 38 shall be typically described, the operation of all such associated networks being substantially the same. The multiplexed communication signal provided via path 36 to the cable distribution network is supplied to the demultiplexer 86 which demultiplexes this multiplexed communication signal. As was previously mentioned, the command signals are contained in one frequency band, the subscription program information signals are contained in another frequency band, and the "free" television signals are contained in still another frequency band. Accordingly, the demultiplexed communication signal is supplied to band pass filters 88, 92 and 96 which only pass the "free" television signals, subscription program information signals, and command signals, respectively. The "free" television signals provided through amplifier 100 to the common display channel signal path 102, and therefrom to the television 38, are normally transmitted to the television except when a subscription program is to be displayed. The subscription program information band output of filter 92 is provided to the mixer 106 where it is mixed with a signal at the appropriate mixing frequency so that the resultant best frequency of the selected program information signal will be the frequency of the common display channel while the associated frequencies of the remaining program information signals will still not be that of the common display channel, or any other display channel on the television display device.

In order to provide the signal at the appropriate mixing frequency, which signal is termed the frequency selection control signal, the command signal output of filter 96, which, as was previously mentioned, is preferably a serial bit digital signal, is supplied to serial-to-parallel shift register 112 which decodes or separates the command signal into its identifier portion supplied via path 116 and its command information portion supplied via path 114.

As was previously mentioned, each command control network 42, 44 has an associated unique address or identity. The identifier portion of the command signal is utilized to determine if the particular command control network 42 is being addressed by the computer 46. Teis is accomplished in conventional fashion by means of digital comparator 118 which compares the identifier portion of the command signal with the assigned identity code for the associated command control newtork 42 and provides an output signal via path 120 when these signals match. This output signal is an enable signal for gate 122 whose information input is the command information signal portion provided via path 114. Thus, when an enable signal is provided to gate 122 indicating that the associated command and control network 42 is being addressed by the computer 46, gate 122 passes the command information portion to synthesizer 126 via path 124.

Now describing the operation of the synthesizer 126 in greater detail. Generally describing the operation of the digital frequency synthesizer shown in FIG. 3, the voltage controlled oscillator 134 is tuned over a frequency range (the range of mixing frequencies) by means of the phase locked loop 132. The frequency selected is held fixed with crystal accuracy through the digitally variable feedback system in the servo loop. The reference frequency derived from the crystal reference oscillator 130 is compared with a signal resulting from the voltage controlled oscillator 134 output, the servo system nulling when these two frequencies are equal. The voltage controlled oscillator 134 output passes through the digital pulse counter or divider 138 which divides the voltage controlled oscillator 134 frequency to a lower frequency. By varying the counter 138 range, a corresponding variation in division ratio is produced. In this manner, the command signal information portion controls the synthesizer output frequency, a change in division ratio generating a change in feedback frequency, which is nulled by the servo varying the voltage controlled oscillator 134 output frequency. In this manner the single, crystal reference oscillator 130 may be used as a reference to generate the plurality of frequencies, each of which inherently has the same accuracy and stability of the crystal reference oscillator 130.

The input to the variable frequency divider 138 is the frequency output signal from the voltage controlled oscillator 134. The output of counter 138 is, therefore, a signal whose frequency is the frequency of the voltage controlled oscillator output signal divided by the division ration "N" of the counter 138, the division ration being an externally programmed number determined by the command signal information portion and which is correlated to the desired frequency output. At equilibrium in the servo system, the two signals into the phase detector 140, that is the reference signal supplied by oscillator 130 and the output signal provided from divider 138, are preferably at the same frequency and are separated by a fixed phase differential. Accordingly, the frequency divider 138 output is a signal at a frequency which is a constant which is equivalent to the reference oscillator 130 frequency. Accordingly, once the division ratio has been chosen for divider 138 in accordance with the command signal information portion, the frequency of the output of voltage controlled oscillator 134 must shift to satisfy the servo equilibrium. If desired, a coarse tuning voltage may be used to adjust the frequency of the voltage controlled oscillator 134 to within the acquisition range of the phase locked loop 132. In this instance, when the voltage controlled oscillator 134 frequency is within this pull-in range, the phase locked loop 132 will acquire and hold the oscillator 134 at the proper frequency. The loop filter 148, together with the gain control of the phase-to-DC voltage converter 146, provides the proper pull-in and hold-in phase loop characteristics.

As was previously mentioned, preferably the frequency divider 138 utilized in synthesizer 126, is a down counter arranged in decimal digits. The counter 138 is initially loaded with a number corresponding to the frequency desired, this number being provided as the command signal information portion. Each alternate zero crossing of the voltage controlled oscillator 134 is converted to a pulse which decreases the counter 138 by one count. When the counter 138 reaches the "all zero" state, an output signal is generated. The counter 138 is then reloaded with frequency information, and the cycle begins again.

If desired, a conventional synthesizer such as one employing harmonic generators and mixers to generate a plurality of frequencies from each source may be utilized in place of the preferred digital frequency synthesizer.

As was previously mentioned, the phase detector 140 is preferably a digital type, such as the AND gate 144 shown in FIG. 6 although, if desired, a two-transformer balanced demoudulator may be utilized as the phase detector 140. With respect to the digital phase detector 144, phase difference in the digital sense is preferably determined by applying two digital signals as inputs to the AND gate 144, the output of the gate being a pulse, the width of which is determined by the relative zero crossings of the two input signals. Thus, the reference oscillator 130 output signal is preferably a digital signal supplied to ANd gate 144 via path 143 as is the output of divider 138 supplied to gate 144 via path 136. The pulse width of the phase detector 140 output is linearlly proportional to the phase difference between these two signals, phase difference being the spacing between the zero crossings of the digital signal. The conversion of this phase signal output of detector 140 to a DC voltage which controls the frequency of the voltage controlled oscillator 134 is accomplished by means of converter 146. This conversion may preferably be accomplished by operating a linear integration pulse duration sampler 174 over a period equal to the pulst width. At the instant the pulse modulated signal changes state, the DC voltage of the integrator 174 is equal to the pulse width. The DC signal is sampled and stored in a memory device and, thus, the integrator may be reset, and the cycle can be repeated. If the new pulse width is the same as the last pulse width, the DC level in the memory unit associated with sampler 174 will remain unchanged between like samples, thus providing a DC signal without AC components.

Alternatively, if desired, this phase signal-to-DC voltage conversion may be accomplished by low pass filtering of the pulse width modulated signal via filter network 170. The low pass filter 170 passes the DC component of this signal and provides attenuation of the high frequency components, sufficient sections of low pass filtering being utilized to provide fast roll-off without introducing excessive phase shift. Furthermore, the filter network 170 preferably includes a rejection filter means at each of the undesired frequencies in the digital signal such as the phase detector frequency and its harmonics. The amplifier 172 associated with the filter network 170 improves the filter response of the converter 146.

As was previously mentioned, the voltage controlled oscillator 134 frequency is controlled by the DC voltage applied to the oscillator 134. Such a typical conventional oscillator 134 is shown in FIG. 5 wherein varactor tuning is utilized to vary the frequency of the oscillator 134. Since the operation of oscillator 134, which is illustratively shown in FIG. 5 is a Clapp type oscillator, is conventional, it will not be described in greater detail hereinafter.

The appropriate mixing frequency provided by synthesizer 126 via path 128 as the tuned output of oscillator 134 is supplied to mixer 106 which provides the proper beat frequency for the selected program information signal. These signals are provided to filter 108 which rejects all signals except a signal at the common display channel frequency. Since the selected program information signal is now at this frequency, this signal will be passed by filter 108 to amplifier 110 and the balance of the signals rejected. This selected program information signal is provided via the common display channel signal path 102 to the television device 38 where it is displayed on the common display channel. Similarly, for television device 40, the command control network 44, which has a different unique identifier, may simultaneously display a different selected program on the common display channel by means of having a different mixing frequency supplied to mixer 106 by the associated synthesizer 126 of network 44; thus, providing a different selected program information signal with the proper beat frequency equivalent to the common display channel signal frequency so that only this different selected program will be passed by filter 108 to the television device 40.

In addition to the subscription program information, if desired, the user may select locally generated "special" "free" television information for display on the common display channel. Such information may be selected by interaction with computer 46 in the manner previously described wherein the computer 46 provides a control signal to the conventional videotape memory device 72 for supplying this stored information to the appropriate television display instead of the ordinarily supplied conventioal "free" television information supplied via path 32 or the subcription program information supplied via path 50. In addition, if desired, the user may obtain additional "special" information to be displayed on the common display channel by individually accessing the computer 46 disc memory 74. Preferably, data is composed in the auxiliary disc memory 74 associated with computer 46 in the form of frames, each frame representing one complete picture on the television screen. In this instance, the computer 46 is preferably programmed so that when it receives a particular instruction from the user's telephone 56 or 58, or keyboard 65, the computer 46 will retrieve the frame requested for subsequent display. The selected frame from disc memory 74 is provided to the conventional character generator 76 which converts this frame retrieval into the form of characters to be displayed on the television screen. The modulator 78 conventionally converts these characters into an RF television picture.

Together with this picture, the computer 46, on its command and control channel, via signal path 84, addresses the particular command control network 42 which will be receiving the picture in the manner previously described with reference to the operation of command control network 42 with respect to receipt of subscription program information. Similarly, computer 46, via command and control channel and signal path 84 associated with the particular command control network, addresses the particular command control network 42 which will be receiving the videotape memory 72 provided picture. The associated command and control network 42 channels the retrieved frame picture onto a conventional frame snatcher 79, such as a Lithocon silicon storage tube of the type manufactured by Princeton Electronic Products. The frame snatcher 79 has the capacity of remembering a single frame of television picture so that the computer 46 may transmit this one frame to the user's television and then may free itself from that television to service other users, the frame remaining in the frame snatcher 79 memory as long as the user does not desire to change it.

The operation of the command control newtork when the subscription program information signals are provided in a separate band of audio portions and a separate band of video portions which, when properly combined form the composite program information signals, wherein the audio portions are provided as a time division multiplexed signal and the video portions are provided as a frequency multiplexed signal, has already been described with reference to FIGS. 7 and 8 and, therefore, will not be described in greater detail hereinafter. Suffice it to say that both with respect to the embodiment shown in FIG. 8 and the embodiment shown in FIG. 2, the computer 46 preferably automatically bills the user for the service or selected program at the time the computer 46 provides the command signal to the associated command control network 42 or 44 to accomplish program selection. At this time, billing information is provided via path 70 to the local teletype billing device 68 and, if desired, to the central invoicing system via path 67.

Similarly, the basic operation of the premises access monitoring system 24 associated with the present invention has previously been described with reference to FIGS. 1 and 2 and will not be described in greater detail hereinafter except as to the preferred manner of utilizing such a system. Assuming the system 24 is utilized in an institution such as a hotel for security surveillance, the operation of this system is as follows.

When a guest checks into the hotel, the front desk clerk will provide him with an identificiation card selected at random from a batch of such cards. Before handing the guest this card, the clerk would insert the card into the card reader located at the front desk while at the same time keying in the guest's assigned room number, both of these pieces of information being supplied to the computer 46 which stores in its memory the guest's card number versus the assigned room number. Before entering the premises being monitored, the guest must insert his identification card into the card reader 180 which transmits the identity code recorded on the card to the computer 46 via the two-way communication link 36. The command control network associated with this premises transmits its unique identity code which corresponds to the associated room number to the computer at this time. The computer 46 then compares the identity code read by card reader 180 with the room number provided by the command and control network 42 against the identity code and room number stored in the computer memory. If they agree, no alert signal is provided.

As was previously mentioned, the door to each premises has an associated door position sensor 182, such as a microswitch operated by a position sensor which checks to see if the door has been opened. This sensor 182, which monitors the condition of the door, transmits a signal to the computer 46 via the two-way communication channel. If the information supplied by the card reader has indicated that the entrant to the room is properly identified, then no alert signal is provided. However, if the door is opened without the guest or user having properly been identified in that the identity code on his card is not the correct code or in that no identity code at all has been provided to the computer 46, the computer 46 will provide an alert signal to the security display device 188 which preferably displays the room number of the premises to which unauthorized entry has been made as well as sounding an audible alarm. It should be noted that, preferably, the card must be read before the door position sensor 182 indicates that the door has ben opened and preferably this condition applies to both entry or egress from the premises.

By utilizing the communication system of the present invention, a plurality of substantially simultaneously transmitted different programs may be selectively displayed on a single common display channel on a plurality of different televisions in a subscription communication system while the user is simultaneously billed for the use at the time the use occurs. Furthermore, such a system may also provide premises access monitoring in addition to subscription commuication program selection.

It is to be understood that the above described embodiments of the invention are merely illustrative of the principles thereof and that numerous modifications and embodiments of the invention may be derived within the spirit and scope thereof.

What is claimed is:

1. A secure subscription communication system for selectively providing at least two substantially simultaneous displays of different program information from a first multiplexed communication signal containing a plurality of different program information signals and a plurality of command signals, said system comprising at least a first and a second display means for displaying said different program information in response to selected program information signals, each display means having a display signal path over which said program information signals are provided, a common display channel having an associated predetermined signal frequency and a common command signal path; a first and a second control means operatively connected to said first and second display means, respectively, via said display signal path; and a first condition responsive means operatively connected to said first and second control means via a common communication signal path, said first multiplexed communication signal being provided to said first and second control means via said communication signal path, said first condition responsive means providing said command signals; said first and second control means each including an associated first signal separation means for separating said first multiplexed communication signal into said plurality of program information signals and said plurality of command signals, an associated program information selection control signal generating means operatively connected to said associated first signal separating means for providing a program selection control signal in response to an associated unique command signal from said first condition responsive means, said program selection control signal generating means associated with said first control means generating a first selection control signal in response to said first control means associated unique command signal, and said program selection control signal generating means associated with said second control means generating a second selection control signal in response to said second control means associated unique command signal, and an associated first signal operating means operatively connected to said associated first signal separating means and said program selection control signal generating means for operating on said plurality of program information signals with said associated program selection control signal for providing one of said selected program information signals to one of said display means at said associated common display signal frequency via said display signal path, said first selection control signal operating on said plurality of program information signals to provide one of at least said two selected program information signals to said first display means for providing one of said substantially simultaneous displays and said second selection control signal operating on said plurality of program information signals to provide said different one of said selected program information signals to said second display means for providing said different one of said substantially simultaneous displays, whereby a plurality of substantially simultaneously transmitted different programs may be selectively displayed on said common display channel.

2. A system in accordance with claim 1 wherein each of said separated plurality of program information signals has a different associated frequency, said associated frequencies being different from each other and from said common display channel associated frequency; said first and second program information selection control signals have different associated frequencies; and said first operating means comprises means for combining said first program information selection control signal at its associated frequency with said plurality of program information signals at their respective associated frequencies to provide said one selected program information signal to said first display means at said common display channel associated frequency, and said second operating means comprises means for combining said second program information selection control signal at its associated frequency with said plurality of program information signals at their respective associated frequencies to provide said different one of said selected program information signals to said second display means at said common display channel associated frequency.

3. A system in accordance with claim 2 wherein at least said first combining means is a mixer.

4. A system in accordance with claim 1 wherein said display signal path associated with at least said first display means includes a first filter means operatively connected between said first signal operating means and said first display means for enabling only program information signals at said common display channel frequency to pass to said first display means.

5. A system in accordance with claim 4 wherein said filter means comprises a fixed frequency filter.

6. A system in accordance with claim 1 wherein said first condition responsive means is further connected to a subscription billing means for billing a predetermined charge for said respective selected program information signal in response to said provision of said associated unique command signal to said associated display means.

7. A system in accordance with claim 6 wherein said first condition responsive means is a computer means.

8. A system in accordance with claim 1 wherein at least said first associated signal separation means comprises a first demultiplexer means for demultiplexing said first multiplexed communication signal and passing only said plurality of program information signals to said first associated operating means and only said plurality of command signals to said first associated program selection control signal generating means.

9. A system in accordance with claim 8 wherein said first demultiplexer means comprises filter means.

10. A system in accordance with claim 1 wherein said unique command signal includes a unique identifier portion and a command portion and said associated program information selection control signal generating means includes second signal separating means operatively connected to said first signal separating means for separating said unique command signal into said identifier portion and said command portion, means operatively connected to said second signal separating means for generating an identity check control signal in response to an associated predetermined identifier portion, gating means responsive to said identity check control signal operatively connected to said identity check control signal generating means and said second signal separating means for passing said associated command portion in response to said identity check control signal, and means operatively connected to said gating means for generating said selection control signal in response to said command portion.

11. A system in accordance with claim 10 wherein said unique command signal is a digital signal and said second signal separating means is a shift register means.

12. A system in accordance with claim 11 wherein said identity check control signal generating means is a first digital comparator means, said associated display means control means having an associated unique identity reference, said first digital comparator means comparing said unique identity reference with said unique command signal identifier portion for generating said identity check control signal when said identifier portion is equivalent to said unique identity reference.

13. A system in accordance with claim 12 wherein said gating means comprises an AND gate means, said command portion comprises a command information signal input to said AND gate means and said identity check control signal comprises an enable signal input to said AND gate means, said AND gate means passing said command portion only when said enable signal input is present.

14. A system in accordance with claim 10 wherein each of said separated plurality of program information signals has a different associated frequency, said associated frequencies being different from each other and from said common display channel associated frequency; at least said first program information selection control signal has an associated frequency different from both said program information signal associated frequencies and said common display channel associated frequency; said first operating means comprises means for combining said first program information selection control signal at its associated frequency with said plurality of program information signals at their respective associated frequencies to provide at least said one selected program information signal to said first display means at said common display channel associated frequency; and said means for generating said selection control signal in response to said command portion comprises frequency synthesizer means for snythesizing said selection control signal at said selection control signal associated frequency, said frequency synthesizer means comprising a phase locked loop including first signal frequency generating means for generating said selection control signal at said associated frequency thereof, a reference signal generating means for providing a reference signal to said phase locked loop at a predetermined frequency and means for tuning said first signal generating means in said phase locked loop to said selection control signal frequency, said tuning means being operatively connected in said phase locked loop to said reference signal means and said first signal generating means.

15. A system in accordance with claim 14 wherein said first signal generating means selection control generated signal has an associated phase and said reference signal has an associated phase, said first signal generating means selection control phase, frequency being dependent on an associated driving signal for said first signal generating means, a different driving signal resulting in a different selection control signal frequency, said driving signal being provided by said tuning means, and said tuning means includes phase detector means and means operatively connected to said gating means and said first signal generating means for varying said frequency of said generated selection control signal in response to said command portion, said selection control signal frequency varying means providing a comparison signal having an associated frequency and phase to said phase detector, said comparison signal associated frequency being a predetermined fractional multiple of said selection control signal frequency, said fractional multiple being dependent on said command portion, said comparison signal phase being equivalent to said selection control signal phase, said phase detector means comparing said comparison signal and reference signal phases and providing said associated driving signal when said phase locked loop is in an equilibrium state, said equilibrium state occurring when said comparison signal and reference signal frequencies are substantially equivalent and said comparison signal and reference signal phases are separated by a predetermined phase differential.

16. A system in accordance with claim 15 wherein said means for varying said selection control signal frequency to provide said comparison signal comprises a frequency divider means having a variable division ratio, said division ratio varying in response to variations in said command portion.

17. A system in accordance with claim 16 wherein said unique command signal is a digital signal with said command portion being a digital signal, and said frequency divider means comprises a variable length counter means, said comparison signal frequency being dependent on said count length.

18. A system in accordance with claim 17 wherein said counter means is a down counter means.

19. A system in accordance with claim 17 wherein said reference signal and said comparison signal are digital signals, and said phase detector means comprises an AND gate means having said comparison signal as one input thereto and said reference signal as another input thereto, said AND gate means providing said driving signal as a digital signal, said driving signal having a pulse width proportional to said phase differential.

20. A system in accordance with claim 15 wherein said first signal generating means comprises voltage controlled oscillator means whose signal output frequency is dependent on the voltage of said driving signal, and said phase detector means further comprises means for converting said phase differential resulting from said phase comparison into said driving signal voltage.

21. A system in accordance with claim 10 wherein at least said first associated separated plurality of program information signals is a second time division multiplexed signal, said command portion includes a time slot select portion and a program select portion, and said first associated means for generating said selection control signal in response to said command portion comprises second comparator means for comparing said time slot select portion and said program select portion and providing said selection control signal when said time select portion substantially corresponds to said program select portion, each one of said plurality of program information signals in said second multiplexed signal having a different corresponding time slot in said second multiplexed signal.

22. A system in accordance with claim 21 wherein said unique command signal is a digital signal and said second signal separating means is a shift register means.

23. A system in accordance with claim 22 wherein said indentity check control signal generating means is a first digital comparator means, said associated display means control means having an associated unique identity reference said first digital comparator means comparing said unique identity reference with said unique command signal identifier portion for generating said identity check control signal when said identifier portion is equivalent to said unique identity reference.

24. A system in accordance with claim 23 wherein said gating means comprises an AND gate means, said command portion comprises a command information signal input to said AND gate means and said identity check control signal comprises an enable signal input to said AND gate means, said AND gate means passing said command portion only when said enable signal input is present.

25. A system in accordance with claim 21 wherein said second multiplexed signal is a digital signal and said associated program information selection control signal is a digital signal, and at least said first associated signal operating means comprises third signal separating means for separating said one selected program information signal from said plurality of program information signals, said digital program information selection control signal and said digital second multiplexed signal being provided to said third signal separating means whereby said program information selection signal operates on said second multiplexed signal to provide said one selected program information signal.

26. A system in accordance with claim 25 wherein said third signal separating means comprises time division demultiplexer means for demultiplexing said second multiplexed signal.

27. A system in accordance with claim 25 wherein said third signal separating means comprises digital sampler means for operating on said second digital multiplexed signal by sampling said second multiplexed signal when said program information selection control signal is provided thereto, said selection control signal being a sampling pulse.

28. A system in accordance with claim 27 wherein said digital sampling means is a circulating shift register means, said sampling pulse being an unload signal therefor, said circulating register digital length being at least substantially equivalent to the digital length of said one program information signal, said sampling pulse unloading said one selected program information signal from said register means.

29. A system in accordance with claim 27 wherein said first operating means further comprises digital-to-analog converting means operatively connected to said digital sampler means for converting said one digital selected program information signal to an analog signal corresponding thereto, said one selected program information corresponding analog signal being provided to said first display means.

30. A system in accordance with claim 29 wherein at least said first display means is an audio-video display means, said program information signals each have a video portion and an associated audio portion, said second multiplexed signal comprises a plurality of associated audio portion signals, said first signal separating means provides a third plurality of multiplexed video portion signals and said second multiplexed signal, said first signal separating means further comprises means for demultiplexing said third multiplexed signal for providing said one selected program information signal video portion, said converting means provides said one selected program information signal associated audio portion as said analog signal, and said system further includes a combining means operatively connected to said converting means, said demultiplexer means and said first display means in said display signal path for combining said one selected program information audio and video portions to provide said one selected program information signal to said first display means.

31. A system for providing secure subscription communication and premises access monitoring wherein said system selectively provides a display of program information from a first multiplexed communication signal containing a plurality of different program information signals and at least one command signal, said system comprising at least a first display means for displaying said selected program information in response to one of said selected program information signals, said display means having a display signal path over which said program information signals are provided, a common display channel having an associated predetermined signal frequency and a common command signal path; a first control means operatively connected to said first display means via said display signal path; and a first condition responsive means operatively connected to said first control means via a common communication signal path, said first multiplexed communication signal being provided to said first control means via said communication signal path, said first condition responsive means providing said command signal; said first control means including an associated first signal separation means for separating said first multiplexed communication signal into said plurality of program information signals and said command signal, an associated program information selection control signal generating means operatively connected to said associated first signal separating means for providing a program selection control signal in response to an associated unique command signal from said first condition responsive means, said program selection control signal generating means associated with said first control means generating a first selection control signal in response to said first control means associated unique command signal, and an associated first signal operating means operatively connected to said associated first signal separating means and said program selection control signal generating means for operating on said plurality of program information signals with said associated program selection control signal for providing said selected one of said program information signals to said display means at said associated common display signal frequency via said display signal path, said first selection control signal operating on said plurality of program information signals to provide said selected program information signal to said first display means for providing said selected display, whereby a plurality of substantially simultaneously transmitted different programs may be selectively individually displayed on said common display channel; and said system further comprises an identity code input means operatively connected to said first condition responsive means via said communication signal path to provide a first identity input condition thereto and an access status monitoring means operatively connected to said first condition responsive means via said communication signal path to provide a second access status input condition thereto, said first condition responsive means providing an alert output signal condition in response to said first and second input conditions when said input conditions are provided thereto and said first input condition does not correspond to a predetermined authorized identity code signal, whereby an alert to unauthorized entry of an access monitored premises may be provided.

32. A system in accordance with claim 31 wherein said access monitored premises has a means for obtaining physical access to said premises, said access status monitoring means comprises bistable means having an accessed condition and an unaccessed condition, said access status input condition being provided in said accessed condition, said bistable means being operatively connected to said physical access obtaining means and to said first condition responsive means via said communication signal path for providing said access status input condition thereto, and said identity code input means comprises card reader means, said identity code being contained on a card means insertable in said reader means, said reader means being operatively connected to said first condition responsive means via said communication signal path for providing said first input condition thereto in response to said identity code of an inserted card means, only one identity code corresponding to said predetermined authorized identity code signal.

33. In a secure subscription communication system for selectively providing at least one display of program information from a first multiplexed communication signal containing a plurality of different program information signals and at least one command signal, said system comprising at least a first display means for displaying said selected program information in response to one of said selected program information signals, said display means having a display signal path over which said program information signals are provided, a common display channel having an associated predetermined signal frequency and a common command signal path; and a first condition responsive means, said first condition responsive means providing said command signal; the improvement comprising a first control means operatively connected to said first display means via said display signal path and to said first condition responsive means via said common communication signal path, said first multiplexed communication signal being provided to said first control means via said communication signal path, said first control means including an associated first signal separation means for separating said first multiplexed communication signal into said plurality of program information signals and said command signal, an associated program information selection control signal generating means operatively connected to said associated first signal separating means for providing a program selection control signal in response to an associated unique command signal from said first condition responsive means, said program selection control signal generating means associated with said first control means generating a first selection control signal in response to said first control means associated unique command signal, and an associated first signal operating means operatively connected to said associated first signal separating means and said program selection control signal generating means for operating on said plurality of program information signals with said associated program selection control signal for providing said selected one of said program information signals to said display means at said associated common display signal frequency via said display signal path, said first selection control signal operating on said plurality of program information signals to provide said selection program information signal to said first display means for providing said selected program information display; said unique command signal includes a unique identifier portion and a command portion and said associated program information selection control signal generating means includes second signal separating means operatively connected to said first signal separating means for separating said unique command signal into said identifier portion and said command portion, means operatively connected to said second signal separating means for generating an identity check control signal in response to an associated predetermined identifier portion, gating means responsive to said identity check control signal operatively connected to said identity check control signal generating means and said second signal separating means for passing said associated command portion in response to said identity check control signal, and means operatively connected to said gating means for generating said selection control signal in response to said command portion.

34. An improved system in accordance with claim 33 wherein said unique command signal is a digital signal and said second signal separating means is a shift register means.

35. An improved system in accordance with claim 33 wherein each of said separated plurality of program information signals has a different associated frequency, said associated frequencies being different from each other and from said common display channel associated frequency; said first program information selection control signal has an associated frequency different from both said program information signal associated frequencies and said common display channel associated frequency; said first operating means comprises means for combining said first program information selection control signal at its associated frequency with said plurality of program information signals at their respective associated frequencies to provide said selected program information signal to said first display means at said common display channel associated frequency; and said means for generating said selection control signal in response to said command portion comprises frequency synthesizer means for synthesizing said selection control signal at said selection control signal associated frequency, said frequency synthesizer means comprising a phase locked loop including first signal frequency generating means for generating said selection control signal at said associated frequency thereof, a reference signal generating means for providing a reference signal to said phase locked loop at a predetermined frequency and means for tuning said first signal generating means in said phase locked loop to said selection control signal frequency, said tuning means being operatively connected in said phase locked loop to said reference signal means and said first signal generating means.

36. An improved system in accordance with claim 35 wherein said first signal generating means selection control generated signal has an associated phase and said reference signal has an associated phase, said first signal generating means selection control signal frequency being dependent on an associated driving signal for said first signal generating means, a different driving signal resulting in a different selection control signal frequency, said driving signal being provided by said tuning means, and said tuning means includes phase detector means and means operatively connected to said gating means and said first signal generating means for varying said frequency of said generated selection control signal in response to said command portion for providing a comparison signal having an associated frequency and phase to said phase detector, said comparison signal associated frequency being a predetermined fractional multiple of said selection control signal frequency, said fractional multiple being dependent on said command portion, said comparison signal phase being equivalent to said selection control signal phase, said phase detector means comparing said comparison signal and reference signal phases and providing said associated driving signal when said phase locked loop is in an equilibrium state, said equilibrium state occurring when said comparison signal and reference signal frequencies are substantially equivalent and said comparison signal and reference signal phases are separated by a predetermined phase differential.

37. An improved system in accordance with claim 36 wherein said means for varying said selection control signal frequency to provide said comparison signal comprises a frequency divider means having a variable division ratio, said division ratio varying in response to variations in said command portion.

38. An improved system in accordance with claim 37 wherein said unique command signal is a digital signal with said command portion being a digital signal, said frequency divider means comprising a variable length counter means, said comparison signal frequency being dependent on said count length.

39. An improved system in accordance with claim 36 wherein said first signal generating means comprises voltage controlled oscillator means whose signal output frequency is dependent on the voltage of said driving signal, and said phase detector means further comprises means for converting said phase differential resulting from said phase comparison into said driving signal voltage.

40. An improved system in accordance with claim 33 wherein at least said first associated separated plurality of program information signals is a second time division multiplexed signal, said command portion includes a time slot select portion and a program select portion, and said first associated means for generating said selection control signal in response to said command portion comprises second comparator means for comparing said time slot select portion and said program select portion and providing said selection control signal when said time select portion substantially corresponds to said program select portion, each one of said plurality of program information signals in said second multiplexed signal having a different corresponding time slot in said second multiplexed signal.

41. An improved system in accordance with claim 40 wherein said second multiplexed signal is a digital signal and said associated program information selection control signal is a digital signal, and at least said first associated signal operating means comprises third signal separating means for separating said one selected program information signal from said plurality of program information signals, said digital program information selection control signal and said digital second multiplexed signal being provided to said third signal separating means whereby said program information selection signal operates on said second multiplexed signal to provide said one selected program information signal.

42. An improved system in accordance with claim 41 wherein said third signal separating means comprises time division demultiplexer means for demultiplexing said second multiplexed signal.

43. An improved system in accordance with claim 41 wherein said third signal separating means comprises digital sampler means for operating on said second digital multiplexed signal by sampling said second multiplexed signal when said program information selection control signal is provided thereto, said selection control signal being a sampling pulse.

44. An improved system in accordance with claim 43 wherein said digital sampling means is a circulating shift register means, said sampling pulse being an unload signal therefor, said circulating register digital length being at least substantially equivalent to the digital length of said one selected program information signal, said sampling pulse unloading said one selected program information signal from said register means.

45. An improved system in accordance with claim 43 wherein said first operating means further comprises digital-to-analog converting means operatively connected to said digital sampler means for converting said one digital selected program information signal to an analog signal corresponding thereto, said one selected program information corresponding analog signal being provided to said first display means.

* * * * *